US011188821B1

US 11,188,821 B1

(12) United States Patent
Kalakrishnan et al.

(10) Patent No.: US 11,188,821 B1
(45) Date of Patent: Nov. 30, 2021

(54) CONTROL POLICIES FOR COLLECTIVE ROBOT LEARNING

(71) Applicant: X Development LLC, Mountain View, CA (US)

(72) Inventors: Mrinal Kalakrishnan, Palo Alto, CA (US); Ali Hamid Yahya Valdovinos, Palo Alto, CA (US); Adrian Ling Hin Li, San Francisco, CA (US); Yevgen Chebotar, Los Angeles, CA (US); Sergey Vladimir Levine, Berkeley, CA (US)

(73) Assignee: X Development LLC, Mountain View, CA (US)

( * ) Notice: Subject to any disclaimer, the term of this patent is extended or adjusted under 35 U.S.C. 154(b) by 1020 days.

(21) Appl. No.: 15/705,601

(22) Filed: Sep. 15, 2017

Related U.S. Application Data

(60) Provisional application No. 62/395,314, filed on Sep. 15, 2016.

(51) Int. Cl.
*G06N 3/08* (2006.01)
*G06N 20/00* (2019.01)
*B25J 9/16* (2006.01)

(52) U.S. Cl.
CPC .............. *G06N 3/08* (2013.01); *G06N 20/00* (2019.01); *B25J 9/161* (2013.01); *B25J 9/163* (2013.01)

(58) Field of Classification Search
CPC .. B25J 9/161; B25J 9/163; G06N 3/08; G06N 20/00
See application file for complete search history.

(56) References Cited

U.S. PATENT DOCUMENTS 7,536,277 B2 * 5/2009 Pattipatti ............ G05B 23/0243
702/183
9,311,600 B1 * 4/2016 Ring ..................... G06N 5/043
(Continued)

FOREIGN PATENT DOCUMENTS

CN         105911863 A  *  8/2016
WO    WO-2017096079 A1  *  6/2017   ............... G06N 3/08

OTHER PUBLICATIONS

Farahnakian et al., Multi-Agent based Architecture for Dynamic VM Consolidation in Cloud, 2014, 2014 40th EUROMICRO Conference on Software Engineering and Advanced Applications, Verona, pp. 111-118. (Year: 2014).*
(Continued)

*Primary Examiner* — Miranda M Huang
*Assistant Examiner* — Chase P. Hinckley
(74) *Attorney, Agent, or Firm* — Fish & Richardson P.C.

(57) ABSTRACT

Methods, systems, and apparatus, including computer programs encoded on computer storage media, of training a global policy neural network. One of the methods includes initializing an instance of the robotic task for multiple local workers, generating a trajectory of state-action pairs by selecting actions to be performed by the robotic agent while performing the instance of the robotic task, optimizing a local policy controller on the trajectory, generating an optimized trajectory using the optimized local controller, and storing the optimized trajectory in a replay memory associated with the local worker. The method includes sampling, for multiple global workers, an optimized trajectory from one of one or more replay memories associated with the global worker, and training the replica of the global policy neural network maintained by the global worker on the sampled optimized trajectory to determine delta values for the parameters of the global policy neural network.

20 Claims, 5 Drawing Sheets

(56) References Cited

U.S. PATENT DOCUMENTS

| | | | | |
|---|---|---|---|---|
| 9,393,693 | B1* | 7/2016 | Kalakrishnan | B25J 9/1602 |
| 9,753,441 | B2* | 9/2017 | Huynh | G05B 13/04 |
| 10,346,741 | B2* | 7/2019 | Mnih | G06N 3/04 |
| 10,445,641 | B2* | 10/2019 | Srinivasan | G06N 3/0454 |
| 10,776,692 | B2* | 9/2020 | Lillicrap | G06N 3/084 |
| 10,846,606 | B2* | 11/2020 | Levchuk | G06Q 50/20 |
| 10,960,539 | B1* | 3/2021 | Kalakrishnan | B25J 9/163 |
| 2012/0254286 | A1* | 10/2012 | Harlow | H04L 41/048 709/202 |
| 2014/0277718 | A1* | 9/2014 | Izhikevich | B25J 9/163 700/250 |
| 2015/0127150 | A1* | 5/2015 | Ponulak | G05D 1/0088 700/250 |
| 2015/0127155 | A1* | 5/2015 | Passot | B25J 9/161 700/257 |
| 2016/0016311 | A1* | 1/2016 | Konolige | B25J 9/1612 700/245 |
| 2016/0096270 | A1* | 4/2016 | Ibarz Gabardos | B25J 9/161 700/253 |
| 2017/0213151 | A1* | 7/2017 | Uchibe | G06N 7/005 |
| 2018/0012137 | A1* | 1/2018 | Wright | G05B 15/02 |
| 2018/0032863 | A1* | 2/2018 | Graepel | G06N 3/006 |
| 2018/0032864 | A1* | 2/2018 | Graepel | G06N 5/003 |
| 2019/0061147 | A1* | 2/2019 | Luciw | B25J 9/163 |

OTHER PUBLICATIONS

Isele et al., "Work in Progress: Lifelong Learning for Disturbance Rejection on Mobile Robots" May 9-13, 2016, pp. 1-5. (Year: 2016).*

Ong et al., "Distributed Q-learning" Oct. 15, 2015, pp. 1-8. (Year: 2015).*

Gomez et al., "Real-Time Stochastic Optimal Control for Multi-agent Quadrotor Systems" Mar. 10, 2016, Association for the Advancement of Artificial Intelligence, pp. 1-10. (Year: 2016).*

Daniel et al., "Hierarchical Relative Entropy Policy Search" Jun. 2016, Journal of Machine Learning Research, pp. 1-50. (Year: 2016).*

Gholami et al., "Decentralized Approximate Bayesian Inference for Distributed Sensor Network" Feb. 21, 2016, pp. 1582-1588. (Year : 2016).*

Mahadevan et Liu, "Sparse Q-learning with Mirror Descent" 2012, pp. 1-10. (Year: 2012).*

Levine et al., "End-to-End Training of Deep Visuomotor Policies" Apr. 2, 2015. (Year: 2015).*

Omidshafiei et al., "Graph-based Cross Entropy Method for Solving Multi-Robot Decentralized POMDPs" May 16-21, 2016, pp. 5395-5402. (Year: 2016).*

Mordatch et al., "Combining Model-Based Policy Search with Online Model Learning for Control of Physical Humanoids" May 16-21, 2016, pp. 242-248. (Year: 2016).*

Kupcsik et al., "Data-Efficient Generalization of Robot Skills with Contextual Policy Search" 2013, AAAI, pp. 1401-1407. (Year: 2013).*

Foerster et al., "Learning to Communicate with Deep Multi-Agent Reinforcement Learning" May 24, 2016, pp. 1-13. (Year: 2016).*

Ammar et al., "Autonomous Cross-Domain Knowledge Transfer in Lifelong Policy Gradient Reinforcement Learning" 2015, pp. 3345-3351. (Year: 2015).*

Wahlstrom et al., "From Pixels to Torques: Policy Learning with Deep Dynamical Models" Jun. 18, 2015. (Year: 2015).*

Depeweg et al., "Learning and Policy Search in Stochastic Dynamical Systems with Bayesian Neural Networks" May 23, 2016, pp. 1-10. (Year: 2016).*

Mnih et al., "Asynchronous Methods for Deep Reinforcement Learning" Jun. 11, 2016, International Conference on Machine Learning . (Year: 2016).*

Lillicrap et al., "Continuous Control with Deep Reinforcement Learning" Feb. 29, 2016, pp. 1-14. (Year: 2016).*

Luo et al., "Asynchronous Distributed Information Leader Selection in Robotic Swarms" Aug. 24-28, 2015, pp. 606-611. (Year: 2015).*

Sugimoto et al., "Trial and Error: Using Previous Experiences as Simulation Models in Humanoid Motor Learning" Feb. 23, 2016, pp. 96-105. (Year: 2016).*

Wang et al., "Multi-agent distributed coordination control: Developments and direction via graph viewpoint" Mar. 26, 2016, pp. 204-218. (Year: 2016).*

Munos et al., "Safe and efficient off-policy reinforcement learning" Jun. 8, 2016. (Year: 2016).*

Sukhbaatar et al., "Learning Multiagent Communication with Backpropagation" May 25, 2016, pp. 1-11. (Year: 2016).*

Hausknecht et al., "Deep Reinforcement Learning in Parameterized Action Space" Feb. 16, 2016, pp. 1-12. (Year: 2016).*

Mathy et al., "SPARTA: Fast global planning of collision-avoiding robot trajectories" 2015, pp. 1-11. (Year: 2015).*

Li et al., "Make Workers Work Harder: Decoupled Asynchronous Proximal Stochastic Gradient Descent" May 21, 2016, pp. 1-19. (Year: 2016).*

Mnih et al., "Asynchronous Methods for Deep Reinforcement Learning" Jun. 16, 2016, pp. (Year: 2016).*

Nair et al., "Massively Parallel Methods for Deep Reinforcement Learning" Jul. 16, 2015. (Year: 2015).*

Peng et al., "Coordinate friendly structures, algorithms, and applications" Aug. 14, 2016, pp. 1-65. (Year: 2016).*

Peng et al., "ARock: An Algorithmic Framework for Asynchronous Parallel Coordinate Updates" May 27, 2016, pp. 1-29. (Year: 2016).*

Feyzmahdavian et al., "An Asynchronous Mini-Batch Algorithm for Regularized Stochastic Optimization" May 18, 2015, pp. 1-23. (Year: 2015).*

Li et al., "Parallel Lasso Screening for Big Data Optimization" Aug. 2016, pp. 1705-1714. (Year: 2016).*

Leblond et al., "ASAGA: Asynchronous Parallel SAGA" Jun. 15, 2016, pp. 1-36. (Year: 2016).*

Yahya et al., "Collective Robot Reinforcement Learning with Distributed Asynchronous Guided Policy Search" Oct. 3, 2016, arXiv:1610.00673. (Year: 216).*

Luo et al., "Asynchronous Distributed Information Leader Selection in Robotic Swarms" Aug. 2015, pp. 606-611. (Year: 2015).*

Vien et al., "Policy Search in Reproducing Kernel Hilbert Space" Jul. 9, 2016, pp. 2089-2096. (Year: 2016).*

Abadi et al. "TensorFlow: Large-scale machine learning on heterogeneous distributed systems," arXiv 1603.04467v2, Mar. 16, 2016, 19 pages.

Chebotar et al. "Path integral guided policy search," IEEE International Conference on Robotics and Automation, (under review) May 2017, arXiv 1610.00529v1, Oct. 3, 2016, 8 pages.

Chen et al. "Revisiting distributed synchronous sgd" arXiv 1604.00981v3, Mar. 21, 2017, 10 pages.

Daniel et al. "Hierarchical relative entropy policy search," Artificial Intelligence and Statistics, Mar. 2012, 9 pages.

Dean et al. "Large scale distributed deep networks," Advances in neural information processing systems, Dec. 2012, 9 pages.

Deisenroth et al. "A survey on policy search for robotics," Foundations and Trends in Robotics, 2(1-2) Aug. 2013, 27 pages.

Hinterstoisser et al. "Going further with point pair features," European Conference on Computer Vision, Springer International Publishing, Oct. 8, 2016, 15 pages.

Ijspeert et al. "Movement imitation with nonlinear dynamical systems in humanoid robots," IEEE International Conference on Robotics and Automation, May 2002, 6 pages.

Kehoe et al. "A survey of research on cloud robotics and automation," IEEE Transactions on Automation Science and Engineering, 12(2), Apr. 2015, 8 pages.

Kehoe et al. "Cloud-based robot grasping with the google object recognition engine," IEEE International Conference on Robotics and Automation, May 2013, 8 pages.

Lampe et al. "Acquiring visual servoing reaching and grasping skills using neural reinforcement learning," IEEE International Joint Conference on Neural Networks, Aug. 2013, 8 pages.

LeCun et al. "Deep learning," Nature, 521(7553) May 2015, 9 pages.

(56) References Cited

OTHER PUBLICATIONS

Levine et al. "End-to-end training of deep visuomotor policies," Journal of Machine Learning Research, 17(39), Jan. 1, 2016, 40 pages.
Levine et al. "Learning neural network policies with guided policy search under unknown dynamics," Advances in Neural Information Processing Systems, Dec. 2014, 9 pages.
Li et al. "Iterative linear quadratic regulator design for non-linear biological movement systems," ICINCO(1) Aug. 2004, 8 pages.
Lillicrap et al. "Continuous control with deep reinforcement learning," arXiv 1509.02971v5, Feb. 29, 2016, 14 pages.
Montgomery et al. "Guided policy search as approximate mirror descent," arXiv 1607.04614, Jul. 15, 2016, 14 pages.
Peters et al. "Relative entropy policy search," AAAI, Jul. 11, 2010, 6 pages.
Schulman et al. "Trust region policy optimization," Proceedings of the $32^{nd}$ International Conference on Machine Learning, Jul. 2015, 9 pages.
Tedrake et al. "Stochastic policy gradient reinforcement learning on a simple 3d biped," International Conference on Intelligent Robots and Systems, Oct. 2004, 6 pages.
Theodorou et al. "A generalized path integral control approach to reinforcement learning," Journal of Machine Learning Research, Nov. 11, 2010, 45 pages.
Tompson et al. "Joint training of a convolutional network and a graphical model for human pose estimation," Advances in Neural Information Processing Systems, Dec. 2014, 9 pages.
Wang et al. "Bregman alternating direction method of multipliers," Advances in Neural Information Processing Systems, Dec. 2014, 9 pages.
Zinkevich et al. "Parallelized stochastic gradient descent," Neural Information Processing Systems, Dec. 2010, 9 pages.
Stulp et al., "Path Integral Policy Improvement with Covariance Matrix Adaptation," Proceedings of the 29th International Conference on Machine Learning, 2012, 8 pages.

* cited by examiner

CONTROL POLICIES FOR COLLECTIVE ROBOT LEARNING

BACKGROUND

This specification relates to selecting actions to be performed by a robotic agent.

Robotic agents interact with an environment by receiving data characterizing a state of the environment, and in response, performing an action in order to attempt to perform a robotic task. Some robotic agents use neural networks to select the action to be performed in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to selecting actions to be performed by a robotic agent.

The subject matter described in this specification can be implemented in particular embodiments so as to realize one or more of the following advantages. A distributed training system can effectively and directly learn complex feedback control policies that map from high-dimensional sensory inputs to motor torques for manipulation tasks with discontinuous contact dynamics, i.e., by training a global policy neural network as described in this specification. In particular, by training the global policy neural network as described in this specification, the distributed training system can effectively learn a distributed training policy even for contact-rich tasks that require fine action control. Additionally, the distributed training system can learn an effective policy both from observations that are low-dimensional observations and from observations that are high-dimensional pixel inputs. The distributed training system can train the global policy neural network efficiently through distributed learning across multiple local workers that operate asynchronously from each other.

The distributed training system as described in this specification provides a solution that breaks dependencies of each worker at a point that effectively leverages the distributed nature of the system to improve the training of the global policy neural network. That is, it is difficult to determine what elements of the system can be accessed, delayed, utilized, etc., by each worker without affecting the performance of the other workers and the overall system as accomplished by the distributed training system described in this specification. Additionally, assumptions of the training algorithm are necessarily violated when applied to this distributed learning process, and the distributed training system as described in this specification effectively trains the global policy neural network despite these violations by effectively dividing the training process across local and global workers. For example, assumptions that the global policy is constantly up-to-date relative to local policies are violated by distributing the training across multiple asynchronous workers. Furthermore, the distributed training system as described in this specification distributes the training in such a way that the benefit of a greater data set size obtained by using multiple local workers outweighs the additional bias introduced by asynchronous training, as may occur with other distributed frameworks. The distributed training system as described in this specification effectively leverages the increased amount of data that can be generated to accelerate the training of a global policy neural network that implements a complex, nonlinear neural network policy. Thus, the distributed training system efficiently makes use of the computational resources allocated to the system to more quickly train the global policy neural network and therefore learn a control policy for a robotic agent.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a distributed training system that trains a global policy neural network for use in selecting actions to be performed by a robotic agent interacting with a real-world environment to perform a robotic task, such as opening a door, picking up an object and placing it down, and so on. In some examples, the robotic task can have discontinuous dynamics, i.e., the dynamics of the environment are discontinuous at certain states of the environment. In order to interact with the environment, the robotic agent receives or generates data characterizing the current state of the environment and performs an action in response to the data.

The global policy neural network is configured to receive as input an observation, i.e., data characterizing a state of the environment, and to process the observation to generate a global policy output in accordance with current values of the parameters of the global neural policy neural network. The observation can include high-dimensional data characterizing the state of the environment, e.g., raw sensor data captured by one or more sensors of the robotic agent, such as visual data, inertial measurement unit (IMU) readings, and so on. The global policy output defines a distribution over possible actions to be performed by the agent in response to the observation. For example, the global policy output may include a mean action vector and covariances of the entries of the mean action vector. As an example, an action may include a respective torque to be applied to each of multiple joints of the robotic agent. In this example, the global policy output includes a mean action vector that includes a respective entry, i.e., a respective mean torque, for each joint and covariances of the entries of the mean action vector.

Figure 1:
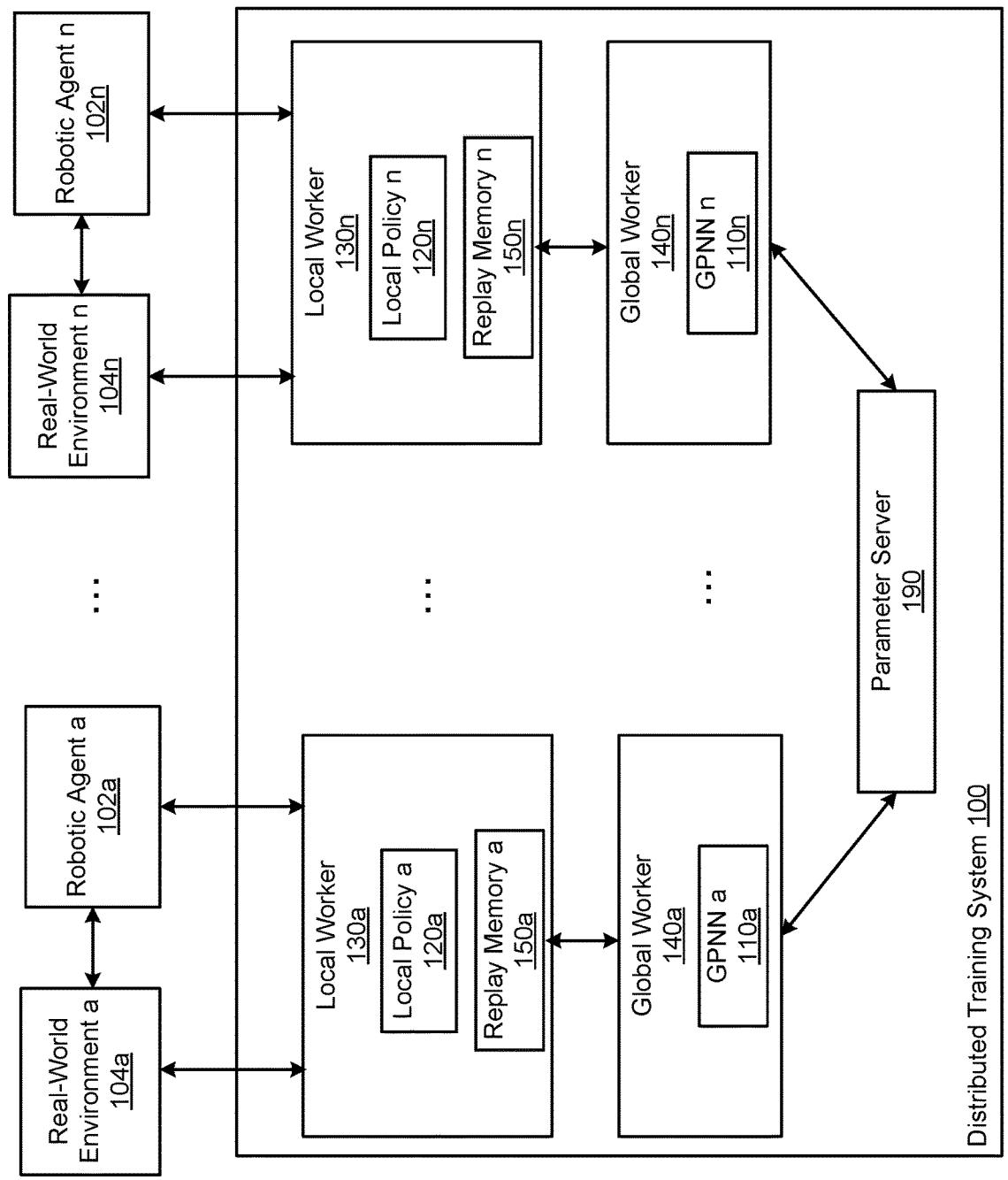
FIG. 1 shows an example distributed training system.

FIG. 1 shows an example distributed training system 100. The distributed training system 100 is an example of a system implemented as computer programs on one or more computers in one or more locations in which the systems, components, and techniques described below are implemented.

The distributed training system 100 is a system for distributed training of a global policy neural network and includes multiple local workers 130*a-n*, multiple global workers 140*a-n*, and a parameter server 190. In particular, the distributed training system 100 trains the global policy neural network to allow the neural network to effectively be used to select actions performed by a robotic agent interacting with a real-world environment.

Each local worker 130*a-n* corresponds to one of multiple robotic agents 102*a-n* that interacts with a respective instance of the real-world environment 104*a-n*. During the training of the global policy neural network, each of the multiple local workers 130*a-n* repeatedly performs a local step of an optimization algorithm asynchronously from each of the other local workers 130*a-n*. Generally, each local worker operates asynchronously from each other worker because each local worker performs the local step of the optimization algorithm without waiting for other local workers, i.e., each local worker can move on to the next iteration of the local step without waiting for the other local workers to finish the current iteration.

In some implementations, each of the local workers 130*a-n* is implemented on a respective computer. In other implementations, two or more of the local workers 130*a-n* are implemented on the same computer but each of these workers execute in a separate thread, process or other hardware or software within the computer capable of independently performing the computation for the worker.

Instead of directly learning the parameters of the global policy neural network, in the first step of the training approach, each local worker 130*a-n* uses a trajectory-centric algorithm to learn simple policy controllers, or local policy controllers 120*a-n*, for trajectories with various initial conditions of the robotic task being performed by the robotic agent 102*a-n* corresponding to the local worker.

In particular, for each local step, each local worker 130*a-n* initializes a particular instance of the robotic task and generates a trajectory of state-action pairs by selecting actions to be performed by the corresponding robotic agent 102*a-n* while the robotic agent 102*a-n* is performing the instance of the robotic task.

Generally, different instances of a task are instances of the task that have different initial conditions. For example, the distributed training system 100 can initialize different instances of a particular robotic task by randomly selecting an initial state of the instance of the environment 104*a-n* corresponding to the local worker 130*a-n*. For example, the system 100 can randomly select an initial position of an object, such as an initial rotation of the handle of a door, an initial position of a bottle on a table, etc., in the environment instance 104*a-n*. In some examples, the initial state of the task for a new instance is generated by an external system or by a user.

Each local worker 130*a-n* generates a trajectory of state-action pairs by selecting actions to be performed by the instance of the robotic agent corresponding to the local worker while performing the instance of the robotic task. The state-action pairs in the trajectory are data identifying states of the environment that occurred during the instance of the task, and, for each of the states, the action performed by the agent while the environment was in the state. Generating the trajectory is described in more detail below with reference to FIG. 3.

The local worker 130*a-n* then optimizes a corresponding local policy controller 120*a-n*. That is, for each instance, the corresponding local worker 130*a-n* optimizes a controller that is specific to the instance on the trajectory of state-action pairs for the instance. Each local policy controller 120*a-n* can generate a local policy output that defines a distribution over the possible actions based on low-dimensional data characterizing the state of the environment. For each instance, the local policy controller 120*a-n* that is specific to the instance can be a time-varying linear-Gaussian controller. Optimizing a local policy controller is described in more detail below with reference to FIG. 3.

The local worker 130*a-n* then generates an optimized trajectory using the optimized local policy controller 120*a-n* and stores the optimized trajectory in a replay memory 150*a-n* associated with the local worker 130*a-n*. Generally, an optimized trajectory for a given trajectory includes observations characterizing the states encountered by the agent during the trajectory, and, for each observation, the output generated by the optimized local policy controller for a low-dimensional input characterizing the state. That is, for a given observation characterizing a given state, the optimized trajectory includes the observation and the output generated by the local policy controller based on low-dimensional data characterizing the given state after the controller has been optimized on the trajectory. The optimized trajectory can also include data tracking which local policies generated the optimized trajectory in order to reweight the data in the replay memory with importance sampling.

Generally, each of the replay memories 150*a-n* can be a buffer that contains previously collected experience data from which the global policy neural network is trained.

Each of the multiple global workers 140*a-n* maintains a respective replica 110*a-n* of the global policy neural network. Each of the replicas 110*a-n* is an instance of the global policy neural network, with possibly different parameter values at any given time during the training. That is, each replica has an identical architecture, but with possibly different parameter values.

During the training of the global policy neural network, each global worker 140*a-n* repeatedly performs a global step of the optimization algorithm to collectively train the network.

That is, in the second step of the training approach, the distributed training system 100 uses the stored optimized trajectories generated by the local workers 130*a-n* to train multiple replicas of the global policy neural network associated with multiple global workers 140*a-n* for learning a complex high-dimensional global policy in a supervised manner. This framework maximizes utilization of each local worker 130*a-n* by continually executing and optimizing local policies 120*a-n* without having the local workers 130*a-n* be directly involved in the updating of the parameters of the global policy neural network.

In some examples, the system 100 includes the same number of global workers 140*a-n* as local workers 130*a-n* and each global worker 140*a-n* corresponds to a different one of the robotic agents 102*a-n*. In these examples, each global worker 140*a-n* can be associated with the same replay memory 150*a-n* as the corresponding local worker 130*a-n*. In some other examples, the system 100 includes a different number of global workers 140*a-n* from local workers 130*a-n*, and each global worker 140*a-n* corresponds to a possibly overlapping subset of the local workers 130a-n and can access the replay memories of any of the local workers in the corresponding subset.

Each of the multiple global workers 140a-n trains the corresponding global policy neural network replica 110a-n of the global policy neural network in a supervised manner.

In particular, in the global step, each global worker 140a-n samples a stored optimized trajectory from one of the one or more replay memories 150a-n accessible to the global worker 140a-n.

Each global worker 140a-n trains the replica of the global policy neural network 110a-n maintained by the global worker on the sampled optimized trajectory to determine delta values for the parameters of the global policy neural network, e.g., using supervised learning. Determining delta values is described in more detail below with reference to FIG. 4.

After the delta values for the parameters have been determined, the global worker 140a-n sends the delta values to the parameter server 190.

The parameter server 190 receives delta values from the global workers 140a-n, updates current values of the parameters of the global policy neural network using the delta values, and provides the updated values of the parameters to the global workers for use in training the replicas of the global policy neural network maintained by the global workers. The operations performed by the parameter server 190 during the training of the global policy neural network are described in more detail below with reference to FIG. 5.

In some implementations, each global worker operates asynchronously from each other global worker. That is, each global worker performs the global step of the optimization algorithm without waiting for other global workers, i.e., each global worker can move on to the next iteration of the global step without waiting for the other global workers to finish the current iteration.

In some other implementations, the global workers are synchronized. That is, after an iteration of the global step is completed, each global worker sends their delta values to the parameter server and waits to obtain updated parameter values before beginning the next iteration.

Additionally, each global worker operates asynchronously from the local workers because the global worker reads asynchronously from the replay memory while the local worker writes to it. That is, a given global worker reads from the memory without waiting for a corresponding local worker to write to the memory and the local worker can write to the memory without waiting for the global worker to have read what the local worker has previously written to the memory.

In some implementations, each of the global workers is implemented on a respective computer. In other implementations, two or more of the global workers are implemented on the same computer but each of these global workers execute in a separate thread, process or other hardware or software within the computer capable of independently performing the computation for the global worker. Additionally, in some implementations, some or all of the global workers are implemented on the same computer as one or more corresponding local workers, with each worker that is implemented on the computer executing in a separate thread, process or other hardware or software within the computer capable of independently performing the computation for the worker.

Once the training procedure has been completed, the distributed training system 100 or another system can effectively use the trained global policy neural network to select actions to be performed by the robotic agent. In particular, when an observation is received, the distributed training system 100 or the other system can process the observation using the trained values of the parameters of the global policy neural network, i.e., values that are the same as the final values stored in the parameter server 190 at the completion of the training procedure, to generate a global policy output used to select a next action to be performed by a robotic agent in accordance with the trained values of the parameters of the global policy neural network.

Although this specification describes the use of a parameter server to store parameter values during training, the techniques described in this specification can be implemented using any appropriate memory that is shared between and accessible by all of the global workers 140a-n. That is, any appropriate mechanism that allows each of the global workers 140a-n to update the stored values of the parameters and to access the currently stored values of the parameters independently of and asynchronously from the other workers 140a-n can be implemented. In some implementations, rather than sending delta values to the parameter server 190 and receiving current values of the parameters from the parameter server 190, each worker 140a-n can directly write updates to and read values from a shared memory.

Figure 2:
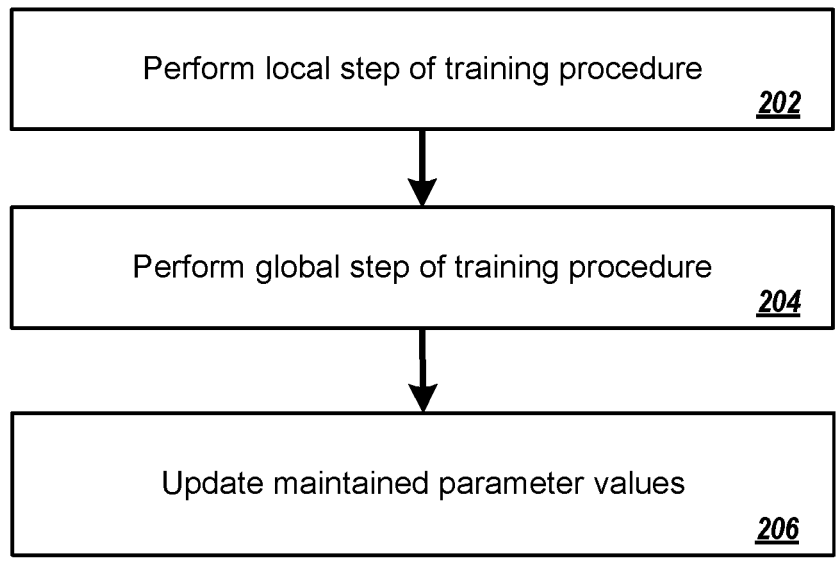
FIG. 2 is a flow diagram of an example process for training a global policy neural network.

FIG. 2 is a flow diagram of an example process 200 for distributed training of a global policy neural network FIG. 1. For convenience, the process 200 will be described as being performed by a system of one or more computers located in one or more locations. For example, a distributed training system, e.g., the distributed training system 100 of FIG. 1, appropriately programmed in accordance with this specification, can perform the process 200.

Each of multiple local workers of the system performs iterations of a local step of the distributed training procedure asynchronously from each other local worker (step 202). During an iteration of the local step, each local worker generates and stores an optimized trajectory in a replay memory associated with the local worker. Performing an iteration of the local step of the training procedure is described in more detail below with reference to FIG. 3.

Each of multiple global workers of the system performs iterations of a global step of the distributed training procedure (step 204). During an iteration of the global step, each global worker samples an optimized trajectory from a replay memory associated with the global worker and trains a replica of the global policy neural network on the optimized trajectory to determine delta values for the parameters of the global policy neural network. Performing an iteration of the global step is described in more detail below with reference to FIG. 4.

A parameter server receives delta values from the global workers and updates the maintained values of the parameters of the global policy neural network using the received delta values (step 206). Updating the maintained values is described in more detail below with reference to FIG. 5.

Figure 3:
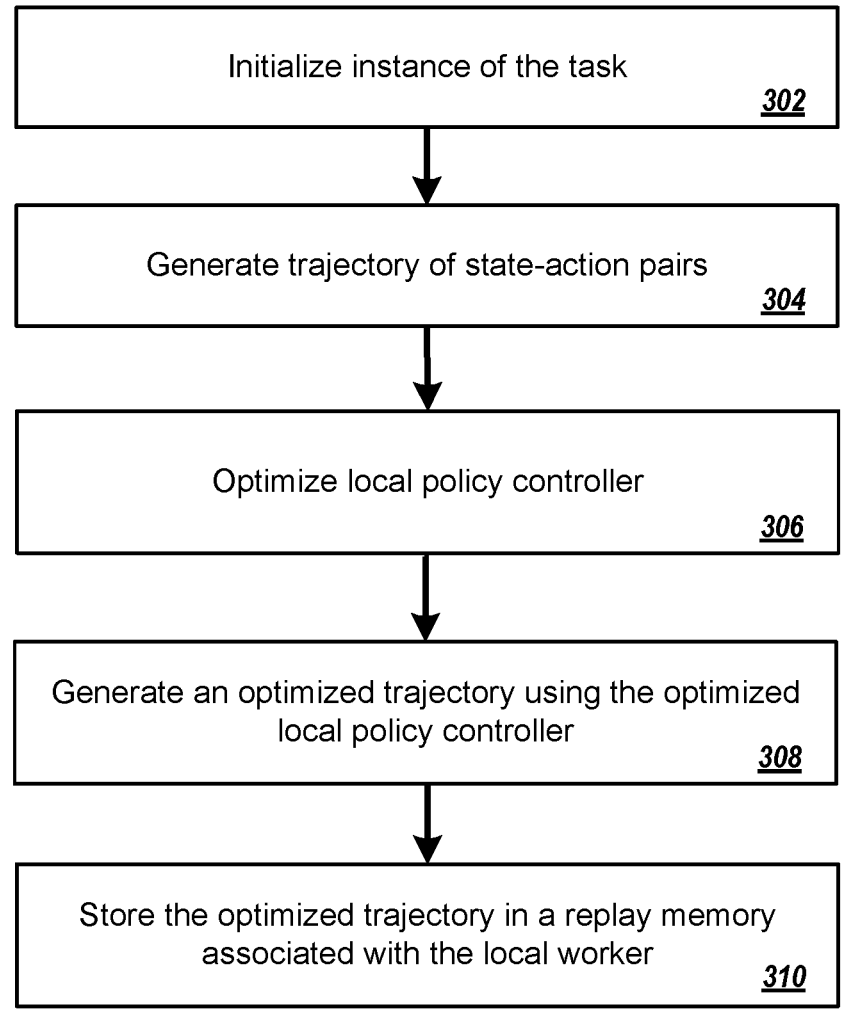
FIG. 3 is a flow diagram of an example process for performing a local step of a distributed training procedure.

FIG. 3 is a flow diagram of an example process 300 for performing the local step of a distributed training procedure. For convenience, the process 300 will be described as being performed by a system of one or more computers located in one or more locations.

For example, each of multiple local workers in a distributed training system, e.g., in the distributed training system 100 of FIG. 1, appropriately programmed in accordance with this specification, can repeatedly perform the process 300 asynchronously from each other local worker during the training of the global policy neural network.

The local worker initializes an instance of the particular task (step 302). As described above, the local worker can initialize an instance of the task with the initial state of the real-world environment corresponding to the local worker being randomly selected.

The local worker generates a trajectory of state-action pairs (step 304). In particular, the local worker selects actions to be performed by the corresponding robotic agent while the robotic agent is performing the instance of the robotic task.

In some implementations, the local worker selects actions using the local policy controller as previously optimized by the local worker, i.e., the local policy controller as optimized during a preceding iteration of the process 300.

In some other implementations, the local worker also maintains or has access to a replica of the global policy neural network and selects actions to be performed by the corresponding robotic agent while performing the instance of the robotic task using the replica of the global policy neural network.

The local worker optimizes a local policy controller on the trajectory (step 306). For example, as described above, the local policy controller can be a time-varying linear Gaussian controller. The local worker can optimize the local policy controller by performing one or more optimization steps of a local policy optimization algorithm on the trajectory of state-action pairs to optimize a local policy controller. The local policy optimization algorithm can be any appropriate trajectory optimization algorithm. For example, the trajectory optimization algorithm can be a policy improvement with path integrals (PI2) algorithm. Performing an optimization step using the PI2 is described in more detail in F. Stulp and O. Sigaud. Path integral policy improvement with covariance matrix adaptation. In ICML, 2012 As another example, the trajectory optimization algorithm can be a linear-quadratic regulators (LQR) algorithm. Performing an optimization step using an LQR algorithm is described in more detail in S. Levine, C. Finn, T. Darrell, and P. Abbeel. End-to-end training of deep visuomotor policies. JMLR, 17(1), 2016.

The local worker generates an optimized trajectory using the optimized local policy controller (step 308). Generally, an optimized trajectory for a given trajectory includes observations characterizing the states encountered by the agent during the trajectory, and, for each observation, the output generated by the optimized local policy controller for the state. That is, for a given observation characterizing a given state, the optimized trajectory includes the observation and the output generated by the local policy controller based on low-dimensional data characterizing the given state after the controller has been optimized on the trajectory. The optimized trajectory can also include data tracking which local policies generated the optimized trajectory in order to reweight the data in the replay memory with importance sampling.

The local worker stores the optimized trajectory in the replay memory associated with the local worker (step 310).

Figure 4:
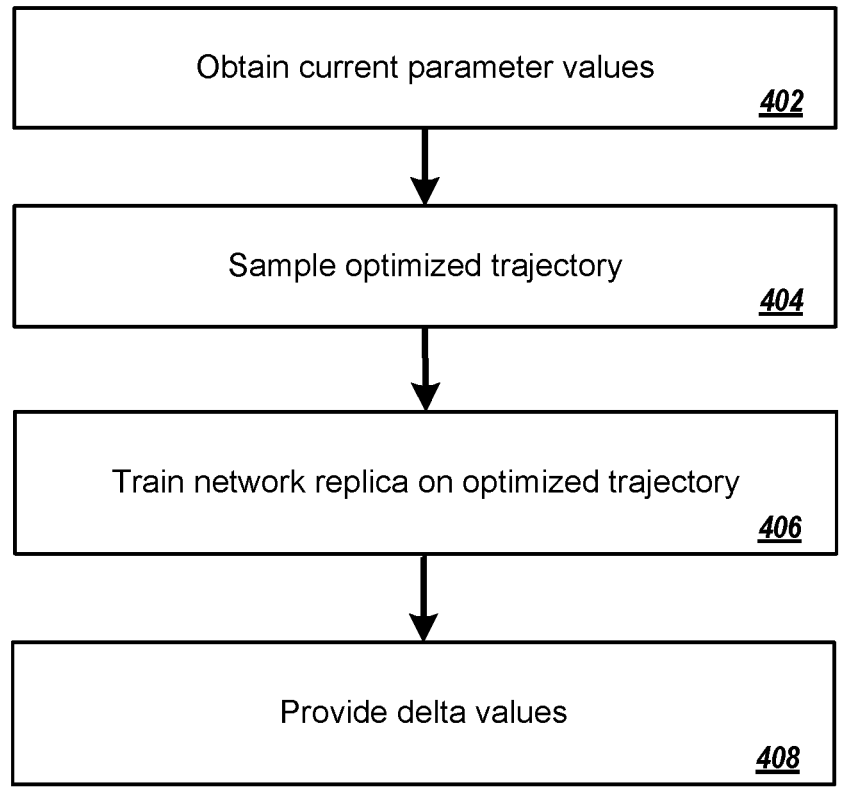
FIG. 4 is a flow diagram of an example process for performing a global step of a distributed training procedure.

FIG. 4 is a flow diagram of an example process 400 for performing the global step of a distributed training procedure. For convenience, the process 400 will be described as being performed by a system of one or more computers located in one or more locations.

For example, each of multiple global workers in a distributed training system, e.g., in the distributed training system 100 of FIG. 1, appropriately programmed in accordance with this specification, can repeatedly perform the process 400 during the training of the global policy neural network.

The global worker obtains current values of the parameters of the global policy neural network from the parameter server (step 402). In some implementations, the global worker obtains new values of the parameters from the parameter server after each iteration of the process 400. In some other implementations, the global worker can re-use the values from the previous iteration of the process 400 until criteria for requesting new values from the parameter server have been satisfied.

The global worker samples an optimized trajectory from a replay memory associated with the global worker (step 404). As described above, in some cases, the global worker is associated with a single replay memory while in other cases the global worker selects, e.g., randomly, a replay memory from multiple replay memories associated with the global worker and samples an optimized trajectory from the selected replay memory.

The global worker trains the replica of the global policy neural network maintained by the global worker on the sampled optimized trajectory to determine delta values for the current values of the parameters (step 406). Generally, each delta value is an update to a respective current parameter value. In particular, the global worker trains the replica using a supervised learning technique on the observations and the outputs in the optimized trajectory to determine the delta values by optimizing an objective function. For example, the objective function can be a mirror descent guided policy search objective function, a Bregman alternating direction method of multipliers (BADMM)-based guided policy search objective function, and so on.

The global worker provides the delta values to the parameter server (step 408). In some cases, the global worker provides the delta values after each iteration of the process 400. In some other cases, the global worker accumulates delta values locally until criteria for providing the delta values are satisfied and then provides the accumulated delta values to the parameter server.

Figure 5:
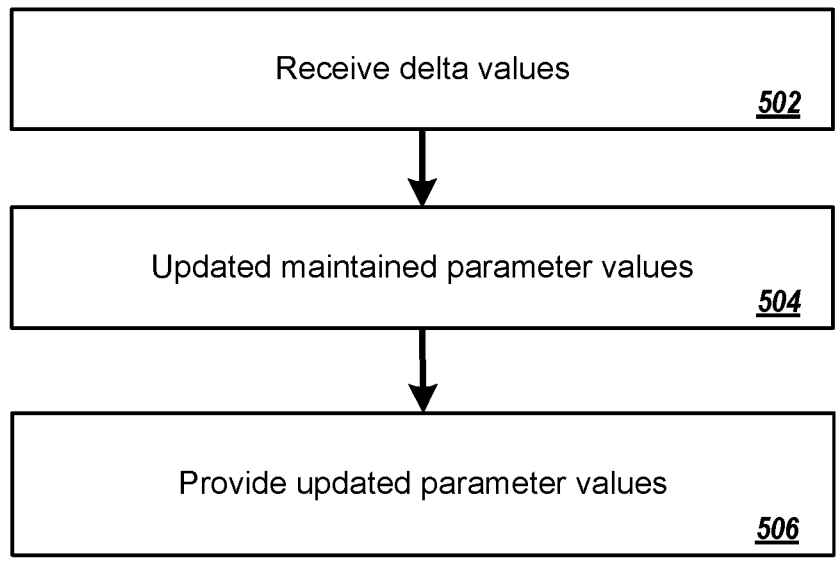
FIG. 5 is a flow diagram of an example process for updating the values of the parameters of the global policy neural network during the training of the global policy neural network.

FIG. 5 is a flow diagram of an example process 500 for updating values of the parameters of the global policy neural network during the training of the global policy neural network. For convenience, the process 500 will be described as being performed by a system of one or more computers located in one or more locations.

For example, a parameter server in a distributed training system, e.g., in the distributed training system 100 of FIG. 1, appropriately programmed in accordance with this specification, can repeatedly perform the process 500 during the training of the global policy neural network.

The parameter server receives delta values from the global workers (step 502). In implementations where the global workers operate asynchronously, the parameter server can receive the values asynchronously, i.e., can receive delta values from different global workers at different times, and can receive delta values computed as part of iteration k of the global step of the training procedure from one worker before receiving delta values computed as part of iteration k−1 of the global step from another worker.

In implementations where the global workers are synchronized, the delta values being received from the global workers are computed as part of the same iteration of the global step.

The parameter server updates the parameters maintained by the parameter server using the received delta values (step 504). Generally, the parameter server adds the delta values or values derived from received delta values to the current values of the parameters. In some cases, the parameter server multiplies the received delta values by a learning rate and then adds the resulting product to the values of the parameters. In implementations where the delta values are received asynchronously, the parameter server also updates the parameter values asynchronously. In some implementations where the global workers are synchronized, the parameter server waits until delta values from the current iteration have been received from all of the global workers before updating the parameters. In other implementations where the global workers are synchronized, the parameter server waits until delta values from the current iteration have been received from a threshold number of the global workers and then updates the parameters using the delta values received from the threshold number of workers. The parameter server then discards delta values that are received from the remaining global workers. Such an updating scheme is described in more detail in Jianmin Chen et al, REVISITING DISTRIBUTED SYNCHRONOUS SGD, available at https://arxiv.org/pdf/1604.00981.pdf.

The parameter server provides the updated values of the parameters to the global workers for use in training the replicas of the global policy neural network maintained by the global workers (step 506).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for training a global policy neural network used to select actions to be performed by a robotic agent interacting with a real-world environment to perform a robotic task, wherein the global policy neural network is configured to receive as input an observation characterizing a state of the environment and to generate a global policy output in accordance with current values of a plurality of parameters, and wherein the system comprises:
a plurality of local workers, wherein each local worker selects actions to be performed by a different robotic agent interacting with a different instance of the real-world environment, wherein each local worker maintains a respective local policy controller having a different model architecture than the global policy neural network, and wherein each local worker is configured to repeatedly perform the following operations asynchronously from each other local worker:

initializing an instance of the robotic task,
generating a trajectory of state-action pairs by selecting actions to be performed by the robotic agent while performing the instance of the robotic task,
optimizing a local policy controller of the local worker on the trajectory using a first machine learning training technique,
generating an optimized trajectory using the optimized local policy controller of the local worker, and
storing the optimized trajectory in a replay memory associated with the local worker; and
a plurality of global workers that operate asynchronously from the plurality of local workers and in parallel with the plurality of local workers, wherein each global worker maintains a respective replica of the global policy neural network and trains the replica of the global policy neural network using optimized trajectories sampled from one or more replay memories of the local workers, and wherein each global worker is configured to repeatedly perform the following operations asynchronously from the operations performed by the plurality of local workers and in parallel with the plurality of operations performed by the local workers:
sampling an optimized trajectory, from one of one or more replay memories associated with the global worker, that is generated by a local worker of the plurality of local workers using a local policy controller that is optimized using the first machine learning training technique and that has a different model architecture than the global policy neural network; and
training the replica of the global policy neural network maintained by the global worker on the sampled optimized trajectory using a second machine learning training technique which is different than the first machine learning training technique used to train the local policy controllers of the local workers to determine delta values that define an update to the parameters of the global policy neural network.

2. The system of claim 1, further comprising:
a parameter server, wherein the parameter server is configured to repeatedly perform operations comprising:
receiving delta values from the plurality of global workers,
updating current values of the parameters of the global policy neural network using the delta values, and
providing the updated values of the parameters to the global workers for use in training the replicas of the global policy neural network maintained by the global workers.

3. The system of claim 1, wherein initializing an instance of the robotic task comprises:
randomly selecting an initial state of the environment instance corresponding to the local worker.

4. The system of claim 1, wherein generating the trajectory of state-action pairs comprises:
generating the trajectory of state-action pairs by selecting actions to be performed by the instance of the robotic agent corresponding to the local worker while performing the instance of the robotic task using a replica of the global policy neural network.

5. The system of claim 1, wherein generating the trajectory of state-action pairs comprises:
generating the trajectory of state-action pairs by selecting actions to be performed by the instance of the robotic agent corresponding to the local worker while performing the instance of the robotic task using the local policy controller as previously optimized by the local worker.

6. The system of claim 1, wherein optimizing the local policy controller of the local worker on the trajectory using the first machine learning training technique comprises:
performing an optimization step with path integral stochastic optimal control on the trajectory of state-action pairs.

7. The system of claim 1, wherein optimizing the local policy controller of the local worker on the trajectory using the first machine learning training technique comprises:
performing an optimization step using a linear quadratic regulator on the trajectory of state-action pairs.

8. The system of claim 1, wherein the model architecture of the local policy controller is a time-varying linear-Gaussian controller architecture.

9. The system of claim 1, wherein the local policy controller receives low-dimensional data characterizing a state of the environment and generates a local policy output.

10. The system of claim 9, wherein each observation is high-dimensional data characterizing the state of the environment.

11. The system of claim 1, wherein the global policy output defines a distribution over a plurality of possible actions to be performed by the robotic agent in response to the observation.

12. The system of claim 1, wherein the system includes the same number of global workers as local workers, wherein each global worker corresponds to a respective local worker, and wherein each global worker is associated with the same replay memory as the corresponding local worker.

13. The system of claim 1, wherein the system includes a different number of global workers than local workers, and wherein each global worker is associated with replay memories that are associated with a possibly overlapping subset of the local workers.

14. The system of claim 1, wherein training the replica of the global policy neural network maintained by the global worker on the sampled optimized trajectory using the second machine learning training technique which is different than the first machine learning training technique used to train the local policy controllers of the local workers to determine delta values for the parameters of the global policy neural network comprises:
determining the delta values by performing one or more iterations of gradient descent to optimize an objective function.

15. The system of claim 14, wherein the objective function is a mirror descent guided policy search objective function.

16. The system of claim 1, wherein each of the plurality of global workers is associated with a respective thread or process that executes the operations of the global worker independently of the operations of the local workers.

17. One or more non-transitory computer storage media storing instructions that when executed by one or more computers cause the one or more computers to implement a system for training a global policy neural network used to select actions to be performed by a robotic agent interacting with a real-world environment to perform a robotic task,
wherein the global policy neural network is configured to receive as input an observation characterizing a state of the environment and to generate a global policy output in accordance with current values of a plurality of parameters, and wherein the system comprises:
a plurality of local workers, wherein each local worker selects actions to be performed by a different robotic agent interacting with a different instance of the real-world environment, wherein each local worker maintains a respective local policy controller having a different model architecture than the global policy neural network, and wherein each local worker is configured to repeatedly perform the following operations asynchronously from each other local worker:
initializing an instance of the robotic task,
generating a trajectory of state-action pairs by selecting actions to be performed by the robotic agent while performing the instance of the robotic task,
optimizing a local policy controller of the local worker on the trajectory using a first machine learning training technique,
generating an optimized trajectory using the optimized local policy controller of the local worker, and
storing the optimized trajectory in a replay memory associated with the local worker; and
a plurality of global workers that operate asynchronously from the plurality of local workers and in parallel with the plurality of local workers, wherein each global worker maintains a respective replica of the global policy neural network and trains the replica of the global policy neural network using optimized trajectories sampled from one or more replay memories of the local workers, and wherein each global worker is configured to repeatedly perform the following operations asynchronously from the operations performed by the plurality of local workers and in parallel with the plurality of operations performed by the local workers:
sampling an optimized trajectory, from one of one or more replay memories associated with the global worker, that is generated by a local worker of the plurality of local workers using a local policy controller that is optimized using the first machine learning training technique and that has a different model architecture than the global policy neural network; and
training the replica of the global policy neural network maintained by the global worker on the sampled optimized trajectory using a second machine learning training technique which is different than the first machine learning training technique used to train the local policy controllers of the local workers to determine delta values that define an update to the parameters of the global policy neural network.

18. A method for training a global policy neural network used to select actions to be performed by a robotic agent interacting with a real-world environment to perform a robotic task,
wherein the global policy neural network is configured to receive as input an observation characterizing a state of the environment and to generate a global policy output in accordance with current values of a plurality of parameters, and wherein the method comprises:
repeatedly performing first operations by each of a plurality of local workers asynchronously from each other worker, wherein each local worker selects actions to be performed by a different robotic agent interacting with a different instance of the real-world environment, wherein each local worker maintains a respective local policy controller having a different model architecture than the global policy neural network, and wherein the first operations comprise:
initializing an instance of the robotic task,
generating a trajectory of state-action pairs by selecting actions to be performed by the robotic agent while performing the instance of the robotic task,
optimizing a local policy controller of the local worker on the trajectory using a first machine learning training technique,
generating an optimized trajectory using the optimized local policy controller of the local worker, and
storing the optimized trajectory in a replay memory associated with the local worker; and
repeatedly performing second operations by each of a plurality of global workers that operate asynchronously from the plurality of local workers and in parallel with the plurality of local workers, wherein each global worker maintains a respective replica of the global policy neural network and trains the replica of the global policy neural network using optimized trajectories sampled from one or more replay memories of the local workers, and wherein the second operations comprise:
sampling an optimized trajectory, from one of one or more replay memories associated with the global worker, that is generated by a local worker of the plurality of local workers using a local policy controller that is optimized using the first machine learning training technique and that has a different model architecture than the global policy neural network; and
training the replica of the global policy neural network maintained by the global worker on the sampled optimized trajectory using a second machine learning training technique which is different than the first machine learning training technique used to train the local policy controllers of the local workers to determine delta values that define an update to the parameters of the global policy neural network.

19. The method of claim 18, further comprising:
repeatedly performing third operations by a parameter server, wherein the third operations comprise:
receiving delta values from the plurality of global workers,
updating current values of the parameters of the global policy neural network using the delta values, and
providing the updated values of the parameters to the global workers for use in training the replicas of the global policy neural network maintained by the global workers.

20. The method of claim 18, wherein the local policy controller receives low-dimensional data characterizing a state of the environment and generates a local policy output, and wherein each observation is high-dimensional data characterizing the state of the environment.

* * * * *